United States Patent [19]
Dietz et al.

[11] Patent Number: 5,110,931
[45] Date of Patent: May 5, 1992

[54] PROCESS FOR THE PREPARATION OF N,N'-DIMETHYLPERYLENE-3,4,9,10-TETRACARBOXYLIC DIIMIDE IN HIGH-HIDING PIGMENT FORM

[75] Inventors: Erwin Dietz, Kelkheim; Manfred Urban, Wiesbaden, both of Fed. Rep. of Germany

[73] Assignee: Hoechst Aktiengesellschaft, Frankfurt am Main, Fed. Rep. of Germany

[21] Appl. No.: 434,093

[22] Filed: Nov. 8, 1989

Related U.S. Application Data

[63] Continuation of Ser. No. 275,777, Nov. 23, 1988, abandoned.

[30] Foreign Application Priority Data

Nov. 27, 1987 [DE] Fed. Rep. of Germany ....... 3740280

[51] Int. Cl.$^5$ ..................... C07D 471/06; C09B 67/20
[52] U.S. Cl. ..................... 546/37; 108/498; 524/90
[58] Field of Search ............ 546/37; 524/90; 106/498

[56] References Cited

U.S. PATENT DOCUMENTS

| | | | |
|---|---|---|---|
| 4,650,879 | 3/1987 | Spietschka | 549/232 |
| 4,797,162 | 1/1989 | Spietschka et al. | 546/37 |

FOREIGN PATENT DOCUMENTS

| | | | |
|---|---|---|---|
| 0208266 | 1/1987 | European Pat. Off. | |
| 1115711 | 10/1961 | Fed. Rep. of Germany | 546/37 |
| 2153087 | 10/1975 | Fed. Rep. of Germany | |
| 3520807 | 12/1986 | Fed. Rep. of Germany | |
| 2635157 | 2/1987 | Fed. Rep. of Germany | 546/37 |
| 1370433 | 10/1974 | United Kingdom | |

OTHER PUBLICATIONS

Marraccini et al., Chemical Abstracts, vol. 103, 1985, Abstract 72621w.

Primary Examiner—Mukund J. Shah
Assistant Examiner—E. C. Ward

[57] ABSTRACT

Prepration of N,N'-dimethylperylene-3,4,9,10-tetracarboxylic diimide (DMP)

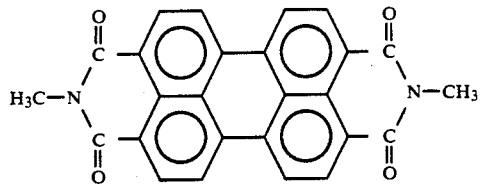

in high-hiding pigment form by reacting perylene-3,4,9,10-tetracarboxylic dianhydride with methylamine. The reaction is carried out at 40° to 200° C. and the excess methylamine is distilled off only after the perylene-3,4,9,10-tetracarboxylic dianhydride used has been fully converted to the methylammonium salts of the corresponding N,N'-dimethyldicarbamoyl-perylenedicarboxylic acids. The temperature is held at 140° to 200° C. after, or after and during the formation of the DMP. The resultant highly crystalline crude pigment in aqueous suspension which has a mean particle size $D_{50\%}$ (mass distribution) of 0.15 to 0.4 μm and a mean length-to-width ratio $q950\%$ (mass distribution of the pigment particles of 10:1 to 3:1, is grounded in aqueous suspension until the mean particle size is 0.1 to 0.2 μm and the mean length-to-width ratio of the pigment particles is less than 5:1. The resultant pre-pigment is heat-treated, in aqueous suspension or, after the addition of an organic solvent, in an aqueous-organic medium, until the pigment has a mean particle size of 0.125 to 0.4 μm and a mean length-to-width ratio of the pigment particles of 4:1 or less. This pigment is particularly useful in pigmenting high-molecular weight resins such as resins used in automotive finishes.

11 Claims, No Drawings

PROCESS FOR THE PREPARATION OF N,N'-DIMETHYLPERYLENE-3,4,9,10-TETRACARBOXYLIC DIIMIDE IN HIGH-HIDING PIGMENT FORM

This is a continuation application of U.S. patent application Ser. No. 07/275,777 filed on Nov. 23, 1988, now abandoned.

The invention relates to the technical field of high-hiding pigments for pigmenting high-molecular materials.

Pigmentation of industrial finishes, especially of automotive finishes, utilizes pigments which furnish high-gloss coatings of high-hiding power and pure color. For the production of red solid colors it has been frequent practice to use combinations of inorganic pigments, for example iron oxide pigments, and red organic hiding pigments. For reasons of economy and color, organic pigments of the highest possible hiding power at a paint film thickness as low as possible, coupled with outstanding rheological properties and a color as pure as possible, are of particular interest. An additional objective is good fastness, particularly weather fastness.

N,N'-Dimethylperylene-3,4,9,10-tetrecarboxylic diimide (DMP) has been used for a long time as an organic red pigment (C.I. Pigment Red 179, C.I. No. 71130), both the transparent form and the hiding form being known.

DE-B-2,153,087 (GB-A-1,370,433) describes the reaction of perylene-3,4,9,10-tetracarboxylic dianhydride with methylamine at 120° to 150° C., high concentrations of the dianhydride being used in the reaction. The DMP crude pigment obtained in the condensation is isolated, dried and then converted to a finished pigment form by intensive grinding and kneading operations, followed by further drying. The pigment is isolated after each stage of the process, thus producing large amounts of waste water. However, the process does not furnish a hiding DMP pigment, but a pigment in transparent form of a particle size of less than 0.1 µm. Even with additional solvent purification of the crude pigment which has accumulated after the synthesis, the pigment is obtained in a form which leaves much to be desired in respect of hiding power, gloss and color purity.

The preparation of a hiding DMP pigment, in which process a finely divided, dry crude DMP pigment of a particle size of less than 0.04 µm is used, is known from EP-A-002,866 (EP-A-0,208,266). The crude pigment is subjected to a recrystallizing grinding process in a mill or disperser in the presence of a liquid organic solvent, following which the DMP pigment is isolated and dried. However, because of the number of operation stages and the quantities of solvent required, the process is elaborate and expensive. Thus, the finely divided crude pigment to be used must first be synthesized, isolated, dried and pulverized. The subsequent grinding in the presence of organic solvents employs considerable quantities of organic solvents which must again be recovered. In addition, large quantities of waste water accumulate, since every stage of the process requires isolation of the product. It has now been found that it is possible to produce high-hiding DMP pigments having equally favorable properties in a simple and ecologically unobjectionable manner.

The subject matter of the invention is a process for the preparation of N,N'-dimethylperylene-3,4,9,10-tetracarboxylic diimide in high-hiding pigment form using the reaction of perylene-3,4,9,10-tetracarboxylic dianhydride with methylamine, wherein at least 3 mol of methylamine are used in the at least 5-fold, preferably 5- to 15-fold, particularly preferably 8- to 12-fold, amount by weight of water, based on the weight of the dianhydride, per mol of perylene-3,4,9,10-tetracarboxylic dianhydride, the reaction is carried out at a temperature of 40° to 200° C. and the excess methylamine is distilled off only after the perylene-3,4,9,10-tetracarboxylic dianhydride used has been fully converted to the methylammonium salts of the corresponding N,N'-dimethyldicarbamoylperylenedicarboxylic acids, the temperature being held for a time at 140° to 200° C. after, or after and already during the formation of the N,N'-dimethylperylene-3,4,9 10-tetracarboxylic diimide in order to produce a highly crystalline form of the pigment, the resultant highly crystalline crude pigment in aqueous suspension which has a mean particle size $D_{50\%}$ (mass distribution) of 0.15 to 0.4 µm and a mean length-to-width ratio $q_{50\%}$ (mass distribution) of the pigment particles of 10:1 to 3:1, particularly of 7:1 to 3.5:1, is subsequently ground in aqueous suspension after intermediate isolation or preferably without intermediate isolation, until the mean particle size is 0.1 to 0.2 µm and the mean length-to-width ratio of the pigment particles is less than 5:1, particularly 4:1 or less, and the resultant pre-pigment is heat-treated, preferably without intermediate isolation, in aqueous suspension or, after the addition of an organic solvent, in an aqueous-organic medium, until the pigment has a mean particle size of 0.125 to 0.4 µm and a mean length-to-width ratio of the pigment particles of 4:1 or less.

The mean particle sizes and the mean length-to-width ratios of the pigment particles defined above refer to a mean value formation in accordance with the mass distribution.

The perylene-3,4,9,10-tetracarboxylic dianhydride to be used in the process according to the invention must be of a certain degree of purity in order to attain outstanding pigment qualities. Perylene-3,4,9,10-tetracarboxylic dianhydride which has been prepared according to the process of German Offenlegungsschrift 3,520,807 (U.S. Pat. No. 4,650,879) is preferably used. To this end the tetrapotassium perylene-3,4,9,10-tetracarboxylate is purified with the aid of activated charcoal and ferric hydroxide. Perylene-3,4,9,10-tetracarboxylic dianhydride is obtained after acidification and filtration in a form suitable for the process according to the invention.

The process according to the invention is preferably carried out using a 5- to 15-fold amount by weight of water at 140° to 200° C., in particular the 8- to 12-fold amount by weight of water, based on the weight of the dianhydride, at 145° to 180° C., the excess methylamine is then distilled off, if desired the reaction mixture is neutralized with an acid in order to stop undesirable odor formation due to traces of monomethylamine, and the crude pigment in aqueous suspension is subjected to the subsequent grinding process without intermediate isolation.

The methylamine which has been distilled off, may be reused for the next condensation reaction. Although it is advantageous to remove all excess methylamine prior to the grinding process, it is also possible not to remove the methylamine until later, for example after the grinding process or only when the pigment is being isolated.

A particularly preferred variant of the process is to carry out the reaction with methylamine at the boiling point of the suspension under normal pressure with ring opening of the anhydride groups, then to distil off excess methylamine, to neutralize, if desired, the reaction mixture with a little acid and then to heat it to a temperature of 140° to 200° C., in particular of 145° to 180° C., to carry out the crystallization of the crude pigment and ultimately the completion of the second stage of the reaction (diimide formation) at this temperature until the desired particle size and particle shape are obtained, and to subject the suspension of the crude pigment to the subsequent grinding process.

Solvents may be used during the crystallization which are again removed prior to grinding and which favorably influence the crystallization. Suitable solvents for this purpose are aliphatic alcohols, aliphatic ketones, aliphatic esters, N-alkylated carboxamides, aromatic hydrocarbons, aromatic halogenated hydrocarbons and heterocyclic bases. Steam-volatile solvents are preferred.

Dispersers and mills, for example vibratory mills, roller mills or preferably discontinuous or continuous agitator ball mills are suitable for the grinding of the pigment suspension obtained after the condensation reaction. The grinding is usually carried out at 5° to 100° C., preferably 10° to 50° C. Balls of 0.3-3 mm diameter, made from quartz, aluminum oxide, zirconium oxide or mixed oxides are preferably used as the grinding media.

The DMP pre-pigment available after the grinding is then heat-treated in an aqueous suspension or—after adding organic solvent—in an aqueous-organic medium until the specified particle size and particle shape is obtained. At least one of the organic solvents added is preferably selected from the group comprising halogenated, particularly chlorinated or brominated aromatic hydrocarbons, such as chlorobenzene, dichlorobenzenes, such as o-dichlorobenzene, 1,2,4-trichlorobenzene or bromobenzene, halogenated, particularly chlorinated and brominated aliphatic hydrocarbons, such as $C_1$-$C_{12}$-chloroalkanes or $C_1$-$C_{12}$-bromoalkanes, alkylbenzenes and alkylnaphthalenes, preferably alkylbenzenes or alkylnapthalenes having 1 to 3 $C_1$-$C_4$-alkyl chains, such as, for example, toluene, ethylbenzene, cumene, cymene, t-butyltoluene and o-, m- and p-xylene as well as methyl-, dimethyl-, isopropyl- and diisopropylnaphthalenes, and the pigment suspension is treated at a temperature from 50° to 200° C. for 1 to 15 hours. Preferred organic solvents for the heat treatment are the said alkylbenzenes and alkylnaphthalenes, particularly o-, m- or p-xylene as well as ethylbenzene. The amount of solvents may vary within a wide range and is usually less than the double amount of solvent based on the weight of the pre-pigment. Approximately the same amount by weight of solvent as of DMP pre-pigment is preferably used. The treatment in the aqueous-organic medium is preferably carried out for 0.5 to 6 hours at 80° to 180° C., preferably 100°-150° C.

In order to improve individual technical application properties, it is possible, but not essential, to add surface-active substances prior to, during or after the condensation, prior to, during or after the grinding or prior to, during or after the final purification. Suitable surface-active substances are cationic, anionic and nonionic surfactants. Pigments prepared in this manner are preferably used in aqueous paint systems. For solvent-borne paint systems the pigments are preferably not used with surface-active substances.

The DMP crude pigments resulting from the synthesis as well as the DMP pre-pigments resulting from the grinding may of course be isolated and worked up separately. However, this is not essential. The preferred procedure according to the invention is one without any intermediate isolation.

The pigments prepared according to the invention are particularly suited for pigmenting high-molecular natural or synthetic organic materials, such as, for example, cellulose ethers and esters, such as ethylcellulose, nitrocellulose, cellulose acetate, cellulose butyrate, natural or synthetic resins, such as polymerization resins or condensation resins, for example aminoplasts, particularly urea-formaldehyde and melamine-formaldehyde resins, alkyd resins, acrylic resins, phenoplasts, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, either individually or in mixtures. In this respect it is immaterial whether the high-molecular organic compounds cited above are in the form of plastic masses, melts, or in the form of spinning solutions, paints, coatings or printing inks. It is advantageous depending on the application, to employ the pigments to be used according to the invention as toners or in the form of preparations or dispersions. The pigments prepared according to the invention are applied in amounts from preferably 0.1 to 10% by weight, based on the high-molecular organic material to be pigmented.

The DMP pigments prepared by the process according to the invention may be particularly used for pigmenting automotive finishes. The current automotive finishes are baking finishes belonging to the class of the alkyd-melamine resin finishes or acrylic-melamine resin finishes as well as two-pack finishes based on polyisocyanate-crosslinkable acrylic resins.

The DMP pigments obtained by the process according to the invention give rise, after processing, to highhiding, red, pure, clear and glossy coatings having very good overcoating fastness and weather fastness.

In addition, the pigments produced possess very good flow characteristics at high pigment concentration and outstanding resistance to flocculation. In combination with inorganic pigments, such as iron oxide pigments, it is possible to produce clear, red colors. The pigments prepared according to the invention, at their highest hiding power, show no bronzing in the paint.

In the examples below, the parts are parts by weight.

EXAMPLE 1

882.2 parts of water are added to 100 parts of perylene-3,4,9,10-tetracarboxylic dianhydride in the form of a moist filter cake (217.8 parts), prepared by the process of German Offenlegungsschrift 3,520,807, and the mixture is stirred for 1 hour at 25° C. After adding 244.2 parts of a 27.3% aqueous monomethylamine solution (equivalent to 66.67 parts of monomethylamine), the reaction mixture is heated to boiling for 2 hours. The monomethylamine is then distilled off at a top temperature of 100° C. The suspension is then heated for 5 hours at 160° C., allowed to cool to 25° C. and its pH is adjusted to 7-7.5 with 98% formic acid. The resultant crude pigment has a mean particle size of 0.17 μm and a mean length-to-width ratio of the pigment particles of 5.3:1. The suspension of the crude pigment is then ground for 1 hour at 20°-30° C. in an agitation ball mill using quartz beads (1 mm in diameter). It is usually necessary to add during the grinding small amounts of water in order to maintain optimum grinding conditions. After grinding the pre-pigment has a mean particle size of 0.113 μm and a mean length-to-width ratio of the pigment particles of 3.5:1. The quartz beads are removed from the pre-pigment suspension by sieving, after which 106.6 parts of xylene are added to 1225 parts of the pre-pigment suspension and the reaction mixture is heated to boiling for 5 hours. The xylene is then removed by steam distillation at a top temperature of 100° C. Filtration by suction, washing and drying at 80° C. furnishes 104 parts of pigment which has a mean particle size of 0.151 μm and a mean length-to-width ratio of the pigment particles of 3.9:1. When incorporated in commercial automotive finishes, produces high-hiding, red, glossy and pure colorations are obtained.

For the determination of particle size and particle shape, the pigment particles accumulating in each case are dispersed in diethyl ether and deposited on a specimen carrier net in the form of a mist in a high-frequency ultrasonic field. Evaluation is carried out by means of transmission-electron micrographs of the pigment particles deposited in the form of a mist.

a) Determination of Particle Size

From the transmission-electron micrographs the circumference of each recorded particle to be evaluated was manually traced and the appropriate projection area and the appropriate particle size D (diameter of a circle of equal area) are calculated therefrom using a graph plate and a computer. The number of all particles as a function of their particle size gives the number distribution, from which the standard mass distribution and particularly the appropriate mean value $D_{50\%}$ of the particle size may be calculated (50% of the total mass of the pigment belongs to particles smaller than $D_{50\%}$).

b) Determination of the Particle Size

For this purpose, the length 1 in the longitudinal direction of the particles and the width b at right angles to it in the center of the particles were measured using a graph plate and the length-to-width ratio q was calculated for each individual particle. A total of frequencies $h_i$ of these ratios $q_i$ was produced as a function of on the magnitude of $q_i$ and the appropriate mean weight $q_{50\%}$ of the mass distribution was calculated.

EXAMPLE 2

A suspension of crude pigment is first prepared according to Example 1, and in this experiment the crude pigment has a mean particle size of 0.167 μm and a mean length-to-width ratio of the pigment particles of 5.9:1. The crude pigment suspension is then ground in a continuous agitation ball mill which is packed with quartz beads 1 mm in diameter, in 4 passes at 20°-30° C. Small amounts of water are added from time to time during the grinding in order to maintain optimum grinding conditions. The resultant pre-pigment has a mean particle size of 0.107 μm and a mean length-to-width ratio of the pigment particles of 3.6:1. 106.6 parts of xylene are added to 1225 parts of the resultant pre-pigment suspension and the mixture is heated to boiling for 5 hours. Xylene is then removed by steam distillation until a top temperature of 100° C. has been reached. The pigment is then filtered off by suction, washed with water and dried at 80° C. 105.6 parts of a pigment which has a mean particle size of 0.141 μm and a mean length-to-width ratio of the pigment particles of 2.8:1, are obtained.

If the resultant pigment is dispersed in an alkydmelamine resin automotive finish in a 21% concentration, a milled material with good flow characteristics is obtained which is then adjusted with unpigmented paint to a pigment content of 7%. The 7% paint capable of being processed, prepared in this manner, has a low viscosity and furnishes glossy, high-hiding, non-flocculating, pure, clear and red coating which are fully hiding at a film thickness as low as 75 μm.

Incorporation into a commercial non-rigid polyvinyl chloride furnishes a color composition of strong depth of color with good dispersibility and excellent mark-off fastness.

If the pigment is dispersed in a commercial nitrocellulose painting ink, glossy prints of good color depth are obtained after application.

EXAMPLE 3

882.2 Parts of water are added to 217.8 parts of a moist filter cake of perylene-3,4,9,10-tetracarboxylic dianhydride (equivalent to 100 parts of dry dianhydride) prepared according to DE-A-3,520,870, and the mixture is stirred for 1 hour at 25° C. 86.9 Parts of a 27.3% aqueous monomethylamine solution are then added and the mixture is heated for 5 hours at 160° C. After cooling to 80° C. the excess monomethylamine is distilled off until a top temperature of 100° C. at normal pressure is reached. The pH of the resultant crude pigment suspension is adjusted at 25° C. to 7-7.5 with 98% formic acid. The crude pigment has a mean particle size of 0.282 μm and a mean length-to-width ratio of the pigment particles of 4.9:1. The crude pigment suspension is then ground in a continuous agitation ball mill in 4 passes in the same manner as in Example 2. The resultant pre-pigment has a mean particle size of 0.109 μm and a mean length-to-width ratio of the pigment particles of 3.5:1. 106.6 parts of xylene are added to 1225 parts of pre-pigment suspension and the mixture is heated to boiling for 5 hours. The xylene is removed by steam distillation until a top temperature of 100° C. at normal pressure is reached, after which the resultant pigment is filtered off by suction, washed with water and dried at 80° C. 102.9 parts of pigment having a mean particle size of 0.139 μm and a length-to-width ratio of the pigment particles of 3.1:1 are obtained. The pigment is eminently suitable for coloring automotive finishes in light red shades.

EXAMPLE 4

The procedure of Example 1 is followed up to the stage when the monomethylamine is distilled off. The mixture is then heated for 5 hours at 175° C., the pigment suspension is allowed to cool to 25° C. and its pH is adjusted to 7-7.5 with 98% formic acid. The resultant crude pigment has a mean particle size of 0.354 μm and a mean length-to-width ratio of the pigment particles of 4.6:1. The crude pigment suspension is then ground in a continuous agitation ball mill in 4 passes in the same manner as in Example 2. The resultant pre-pigment has a mean particle size of 0.173 μm and a mean length-to-width ratio of the pigment particles of 4.0:1. The pre-pigment suspension is then treated with xylene in the same manner as in Example 1 and worked up. 105.9 Parts of a pigment having a mean particle size of 0.203 μm and a mean length-to-width ratio of the pigment particles of 4.0:1 are obtained. The pigment is eminently suitable for coloring automotive finishes in light red shades.

EXAMPLE 5

882.2 Parts of water are added to 217.8 parts of a moist filter cake of perylene-3,4,9,10-tetracarboxylic dianhydride, equivalent to 100 parts of dianhydride, prepared according to DE-A-3,520,807, and the mixture is stirred for 1 hour at 25° C. After adding 244.2 parts of a 27.3% aqueous monomethylamine solution the reaction mixture is heated for 2 hours to 175° C. and its pH is then adjusted to 7-7.5 at 25° C. with 98% formic acid. The resultant crude pigment has a mean particle size of 0.298 $\mu$m and a mean length-to-width ratio of the pigment particles of 5.1:1. The crude pigment suspension is ground in the same manner as in Example 2. A pre-pigment is obtained having a mean particle size of 0.151 $\mu$m and a mean length-to-width ratio of the pigment particles of 3.6:1. After a heat treatment with xylene in the same manner as in Example 2 106.0 parts of a pigment are obtained which has a mean particle size of 0.193 $\mu$m and a mean length-to-width ratio of the pigment particles of 3.9:1. The pigment is eminently suitable for coloring automotive finishes and plastic masses in hiding light red shades.

EXAMPLE 6

The procedure of Example 1 is followed up to the stage when the excess monomethylamine is distilled off. The reaction mixture is then heated for 5 hours at 145° C. and the pH of the suspension is then adjusted to 7-7.5 at 25° C. with 98% formic acid. The resultant crude pigment having a mean particle size of 0.171 $\mu$m and a mean length-to-width ratio of the pigment particles of 3.8:1 is ground without intermediate isolation in the same manner as in Example 2 in 4 passes in a continuous agitation ball mill. The resultant pre-pigment has a mean particle size of 0.137 $\mu$m and a mean length-to-width ratio of the pigment particles of 3.4:1. 1225 Parts of the pre-pigment suspension are heat-treated with 106.6 parts of xylene in the same manner as in Example 1 and worked up.

105.3 Parts of dry pigment having a mean particle size of 0.157 $\mu$m and a mean length-to-width ratio of the pigment particles of 3.4:1 are obtained. The pigment is eminently suitable for coloring automotive finishes and plastic masses in hiding light red shades.

EXAMPLE 7

The procedure of Example 1 is followed up to the stage when the excess monomethylamine is distilled off. The reaction mixture is then heated for 10 hours at 145° C. After adjusting the pH to 7-7.5 at 25° C., the mean particle size of the crude pigment is determined to be 0.182 $\mu$m and the mean length-to-width ratio of the pigment particles 3.9:1. The crude pigment suspension is then ground in the same manner as in Example 2 and the pre-pigment formed having a mean particle size of 0.147 $\mu$m and a mean length-to-width ratio of the pigment particles of 3.1:1 is heat-treated with xylene in the same manner as in Example 2 and worked up. 101.7 parts of pigment having a mean particle size of 0.163 $\mu$m and a mean length-to-width ratio of the pigment particles of 3.2:1 are obtained. The pigment is eminently suitable for coloring automotive finishes and plastic masses in hiding, light red shades.

EXAMPLE 8

The procedure of Example 1 is first followed, but the reaction mixture is heated to 160° C. immediately after the addition of the monomethylamine solution. The mixture is stirred for 5 hours at 160° C., after which it is cooled to 80° C., the excess monomethylamine is distilled off until a top temperature of 100° C. is reached, the suspension is allowed to cool to 25° C. and its pH is adjusted to 7-7.5 with 98% formic acid. The resultant crude pigment having a mean particle size of 0.194 $\mu$m and a mean length-to-width ratio of the pigment particles of 5.7:1 is then ground in the same manner as in Example 2, the resultant pre-pigment having a mean particle size of 0.135 $\mu$m and a mean length-to-width ratio of the pigment particles of 3.2:1. After heat treatment with xylene and working up in the same manner as in Example 2 102.8 parts of pigment are obtained having a mean particle size of 0.238 $\mu$m and a mean length-to-width ratio of the pigment particles of 3.1:1. The pigment is eminently suitable for coloring automotive finishes and plastic masses in hiding red shades.

EXAMPLE 9

882.2 Parts of water are added to 271.8 parts of a moist filter cake of perylene-3,4,9,10-tetracarboxylic dianhydride (equivalent to 100 parts of dry dianhydride), prepared according to DE-A-3,520,807, and the reaction mixture is stirred for 1 hour at 25° C. 244.2 Parts of a 27.3% aqueous monomethylamine solution are then added and the mixture is heated for 2 hours under normal pressure to boiling. The monomethylamine is then distilled off until a top temperature of 100° C. at normal pressure is reached. After the addition of 100 parts of xylene the mixture is heated for 5 hours at 160° C., then cooled to 90° C. and the xylene is removed by steam distillation until a transition temperature of 100° C. under normal pressure is reached. The resultant pigment suspension is allowed to cool and its pH is adjusted to 7-7.5 at 25° C. with 98% formic acid. The resultant crude pigment having a particle size of 0.273 $\mu$m and a mean length-to-width ratio of the pigment particles of 5.8:1 is then ground in a continuous agitation ball mill packed with quartz beads of 1 mm in diameter, in 2 passes at 20°-30° C., smaller amounts of water being added from time to time in order to maintain optimum grinding conditions. The grinding furnishes a pre-pigment which has a mean particle size of 0.162 $\mu$m and a mean length-to-width ratio of the pigment particles of 3.0:1. 110 Parts of xylene are then added to 1225 parts of the pre-pigment suspension and the mixture is heated for 5 hours to boiling. The xylene is subsequently removed by steam distillation until a top temperature of 100° C. under normal pressure is reached. Filtration by suction, washing with water and drying at 80° C. furnishes 104.3 parts of pigment having a mean particle size of 0.362 $\mu$m and a mean length-to-width ratio of the pigment particles of 3.5:1. The pigment is eminently suitable for coloring automotive finishes and plastic masses in hiding red shades.

EXAMPLE 10

The procedure of Example 1 is followed, but the grinding of the crude pigment suspension is carried out in an agitation ball mill packed with zirconium oxide beads of 1 to 1.5 mm in diameter, for 1 hour at 20°-30° C. The following pigment particle parameters are found:

| | | |
|---|---|---|
| crude pigment: | $D_{50\%} = 0.160$ μm, | $q_{50\%} = 5.7:1$; |
| pre-pigment: | $D_{50\%} = 0.12$ μm, | $q_{50\%} = 3.3:1$; |
| pigment: | $D_{50\%} = 0.172$ μm, | $q_{50\%} = 3.7:1$. |

103.2 Parts are obtained from the finished pigment which after incorporation in automotive finishes gives rise to high-hiding, red and pure colors.

EXAMPLE 11

The procedure of Example 2 is followed including the grinding to pre-pigment. 106.6 Parts of ethylbenzene are then added to 1225 parts of the pre-pigment suspension and the mixture is heated for 5 hours to boiling. The ethylbenzene is then removed by steam distillation under normal pressure until a transition temperature of 100° C. is reached. Filtration by suction, washing with water and drying at 80° C. furnishes 102.9 parts of pigment which is eminently suitable for coloring automotive finishes and plastic masses. The following pigment particle parameters are determined:

| | | |
|---|---|---|
| crude pigment: | $D_{50\%} = 0.172$ μm, | $q_{50\%} = 5.9:1$; |
| pre-pigment: | $D_{50\%} = 0.119$ μm, | $q_{50\%} = 3.4:1$; |
| pigment: | $D_{50\%} = 0.149$ μm. | $q_{50\%} = 2.6:1$. |

EXAMPLE 12

The procedure of Example 2 is followed including the grinding of the crude pigment to the pre-pigment. 106.6 Parts of xylene are then added to 1225 parts of the pre-pigment suspension and the mixture is heated for 5 hours at 125° C. After cooling to 90° C. the xylene is removed by steam distillation under normal pressure until a top temperature of 100° C. is reached. Filtration by suction, washing with water and drying at 80° C. furnishes a pigment which is eminently suitable for coloring automotive finishes and plastic masses.

The following pigment parameters are determined:

| | | |
|---|---|---|
| crude pigment: | $D_{50\%} = 0.187$ μm, | $q_{50\%} = 5.4:1$; |
| pre-pigment: | $D_{50\%} = 0.129$ μm, | $q_{50\%} = 3.4:1$; |
| pigment: | $D_{50\%} = 0.140$ μm, | $q_{50\%} = 2.8:1$. |

We claim:

1. A process for the preparation of N,N'-dimethylperylene-3,4,9,10-tetracarboxylic diimide in high-hiding pigment form comprising the step of:
    a) reacting perylene-3,4,9,10-tetracarboxylic dianhydride with at least 3 mol of methylamine in the at least 5-fold amount by weight of water, based on the weight of the dianhydride, per mol of perylene-3,4,9,10-tetracarboxylic dianhydride at a temperature of 40° to 200° C., the resultant highly crystalline crude pigment in aqueous suspension having a mean particle size $D_{50\%}$ (mass distribution) of 0.15 μm to 0.4 μm and a mean length-to-width ratio $q_{50\%}$ (mass distribution) of the pigment particles of 10:1 to 3:1
    b) the said crude pigment is subsequently ground in aqueous suspension after intermediate isolation or without intermediate isolation, until the mean particle size is 0.1 μm to 0.2 μm and the mean length-to-width ratio of the pigment particles is less than 5:1 (pre-pigment), and,
    c) the pre-pigment is heat-treated at a temperature of 50° C. to 200° C., in aqueous suspension or, after the addition of an organic solvent, in an aqueous-organic medium, until the resultant pigment has a mean particle size of 0.125 μm to 0.4 μm and a mean length-to-width ratio of the pigment particles of 4:1 or less.

2. The process as claimed in claim 1, wherin 3-8 mol of methylamine are used per mol of perylene-3,4,9,10-tetracarboxylic dianhydride.

3. The process as claimed in claim 1, wherein the methylamine is used with at most the 15-fold amount by weight of water, based on the weight of the perylene-3,4,9,10-tetracarboxylic dianhydride.

4. The process as claimed in claim 1, wherein the overall reaction with the methylamine is carried out at 140° to 200° C., after which the excess methylamine is distilled off and the crude pigment in aqueous suspension is subjected to the subsequent grinding process without intermediate isolation.

5. The process as claimed in claim 1, wherein the reaction with the methylamine is carried out at the boiling temperature of the suspension under normal pressure, the excess methylamine is then distilled off, the reaction mixture is then heated to a temperature of 140° to 200° C., the resultant crude pigment is crystallized within this temperature range and is then subjected to the grinding process in aqueous suspension without intermediate isolation.

6. The process as claimed in claim 1, wherein at least one organic solvent selected from the group comprising halogenated aromatic and halogenated aliphatic hydrocarbons is added to the pre-pigment after the grinding process and the pre-pigment is then heat-treated in an aqueous-organic medium at a temperature of 50° to 200° C. for 1 to 15 hours.

7. The process as claimed in claim 6, wherein one or more organic solvents selected from the group comprising alkylbenzenes and alkylnaphthalenes with 1 to 3 $C_1$-$C_4$-alkyl chains are used.

8. The process as claimed in claim 1, wherein the crude pigment, the pre-pigment and the finished pigment have the following parameters:

| | | |
|---|---|---|
| crude pigment: | $D_{50\%} = 0.16$–$0.36$ μm; | $q_{50\%} = 7:1$–$3.5:1$ |
| pre-pigment: | $D_{50\%} = 0.1$–$0.18$ μm, | $q_{50\%} = 3.0:1$–$4.0:1$ |
| pigment: | $D_{50\%} = 0.14$–$0.25$ μm; | $q_{50\%} = 2.5:1$–$3.9:1$ |

9. The process as claimed in claim 1, wherein the methylamine is used with at most the 8- to 12-fold amount by weight of water, based on the weight of the perylen-3,4,9,10-tetracarboxylic dianhydride.

10. The process as claimed in claim 9, wherein the overall reaction with methylamine is carried out at 140° C. to 200° C., after which the excess methylamine is distilled off and the crude pigment in aqueous suspension is subjected to the subsequent grinding process without intermediate isolation.

11. The process as claimed in claim 9, wherein the reaction with the methylamine is carried out at the boiling temperature of the suspension under normal pressure, the excess methylamine is then distilled off, the reaction mixture is then heated to a temperature of 140° to 200° C., the resultant crude pigment is crystallized within this temperature range and is then subjected to the grinding process in aqueous suspension without intermediate isolation.

* * * * *